(12) United States Patent
Joshi et al.

(10) Patent No.: US 6,289,482 B1
(45) Date of Patent: Sep. 11, 2001

(54) ERROR AND FLOW CONTROL IN A SATELLITE COMMUNICATIONS SYSTEM

(75) Inventors: Chandra Joshi, Gaithersburg, MD (US); Anthony Noerpel, Lovettsville, VA (US); Xiaoping He, Germantown, MD (US); Prabir Datta, Delhi (IN)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/115,099

(22) Filed: Jul. 13, 1998

Related U.S. Application Data

(60) Provisional application No. 60/052,443, filed on Jul. 14, 1997.

(51) Int. Cl.$^7$ .......................... G08C 25/02; G06F 11/00; H04L 1/00
(52) U.S. Cl. ............................. 714/748; 714/747
(58) Field of Search .................. 714/746, 747, 714/748, 749, 814, 815, 712, 715, 55, 56

(56) References Cited

U.S. PATENT DOCUMENTS

| | | | |
|---|---|---|---|
| 4,641,309 | * 2/1987 | Nakano et al. | 714/747 |
| 5,031,179 | * 7/1991 | Yoshida et al. | 714/748 |
| 5,168,497 | * 12/1992 | Ozaki et al. | 370/394 |
| 5,825,508 | * 10/1998 | Mukai | 358/412 |
| 5,935,267 | * 8/1999 | Hayakawa | 714/748 |

* cited by examiner

Primary Examiner—Christine T. Tu
(74) Attorney, Agent, or Firm—John T. Whelan; Michael W. Sales

(57) ABSTRACT

An approach for error flow control in a communications system involves receiving a plurality of frames of data; determining in said plurality of frames of data, two or more contiguous defective frames of data, the two or more contiguous defective frames of data being followed by at least one frame of data in said plurality of frames that is not defective; forming a group reject message indicative of a range of the two or more contiguous defective frames; transmitting the group reject message; and receiving replacement frames, the replacement frames corresponding to the two or more contiguous defective frames, wherein said at least one frame that is not defective is not received again in response to the group reject message.

16 Claims, 1 Drawing Sheet

ERROR AND FLOW CONTROL IN A SATELLITE COMMUNICATIONS SYSTEM

This application claims priority to U.S. Provisional patent application Ser. No. 60/052,443, of Sales et al.; filed Jul. 14, 1997, for Common Air Interface incorporated herein by reference.

This patent document relates to a common air interface described in a series of patent documents filed concurrently herewith. Related patent documents are:

U.S. patent application Ser. No. 09/115,102, filed Jul. 13, 1998, of Soleimani, et al.; for SIGNALING MAINTENANCE FOR DISCONTINUOUS INFORMATION COMMUNICATIONS;

U.S. patent application Ser. No. 09/115,098 filed Jul. 13, 1998, of Joshi, et al.; for SYSTEM AND METHOD FOR IMPLEMENTING TERMINAL TO TERMINAL CONNECTIONS VIA A GEOSYCHRONOUS EARTH ORBIT SATELLITE;

U.S. patent application Ser. No. 09/115,097, filed Jul. 13, 1998, of Roos, et al.; for MOBILE SATELLITE SYSTEM HAVING AN IMPROVED SIGNALING CHANNEL;

U.S. patent application Ser. No. 09/115,096, filed Jul. 13, 1998, of Noerpel, et al.; for SPOT BEAM SELECTION IN A MOBILE SATELLITE COMMUNICATION SYSTEM, now U.S. Pat. No. 6,233,451;

U.S. patent application Ser. No. 09/115,101, filed Jul. 13, 1998, of Noerpel, et al.; for PAGING RECEPTION ASSURANCE IN A MULTIPLY REGISTERED WIRELESS TRANSCEIVER;

U.S. patent application Ser. No. 09/115,095, filed Jul. 13, 1998, of Joshi, et al.; for IMMEDIATE CHANNEL ASSIGNMENT IN A WIRELESS SYSTEM; and U.S. patent application Ser. No. 09/115,100, filed Jul. 13, 1998, of Roos, et al.; for SYNCHRONIZATION OF A MOBILE SATELLITE SYSTEM WITH SATELLITE SWITCHING, all of which are incorporated herein by reference.

BACKGROUND OF THE INVENTION

The present invention relates to data transfer or communications, and more particularly to data transfer protocols in communications environments. Even more particularly, the present invention relates to a data link layer protocol in a communication environment, such as a satellite-based wireless network.

Wireless telecommunications systems built around earth orbit relays (satellite links) experience a single hop roundtrip propagation delay of approximately 500 milliseconds. Typical implementations of a data link layer protocol employ a "go-back-N" reject protocol with a window size of between one and seven frames.

In accordance with the "go-back-N" reject protocol, when a frame is received, feedback is transmitted to a sender indicating that a particular frame was received. When propagation delay is high, such as in satellite systems, this acknowledgement of receipt may lag behind the sender (transmitter) by a substantial number of frames, e.g., 10 or 15. Thus, by the time a defective frame is detected, a substantial number of subsequent frames have already been sent. When a defective frame is detected, a "go-back-N" message is returned instead of a message indicating that a frame was received successfully. This "go-back-N" message signals the sender to resend starting with the defective frame. Unfortunately, a number of successfully sent frames may already have been communicated to the receiver before the "go-back-N" message is received by the sender. Thus, these frames are resent, even though they were already successful sent, thus expending time and bandwidth, both precious commodities in satellite communication environments.

Another approach, which is available in typical implementations of data link layer protocols is referred to as selective reject. Selective reject, like "go-back-N" reject provides feedback to the sender regarding each frame that was not successfully received. In the event a frame is not successfully received, a message is sent to the sender indicating the frame not successfully received. The sender then resends only that frame. Thus, if frames 1, 7 and 10, by way of example, for a particular transmission are not received successfully, selective reject requires three transmissions to the sender indicating that frames 1, 7 and 10 need to be resent. This is true whether the rejected frames are discontinuous, as in the example presented, or represent a block of frames, which would commonly be the case if interfering signal momentarily disrupted communications from the sender. In response to these messages, the sender will resend only frames 1, 7 and 10.

SUMMARY OF THE INVENTION

The present invention provides a data link layer protocol approach useful in a communications environment, such as a satellite based wireless network.

In one embodiment, the present invention can be characterized as a method for error flow control in a communications system. The method includes steps of receiving a plurality of frames of data; determining in said plurality of frames of data, two or more contiguous defective frames of data, the two or more contiguous defective frames of data being followed by at least one frame of data in said plurality of frames that is not defective; forming a group reject message indicative of a range of the two or more contiguous defective frames; transmitting the group reject message; and receiving replacement frames, the replacement frames corresponding to the two or more contiguous defective frames, wherein said at least one frame that is not defective is not received again in response to the group reject message.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
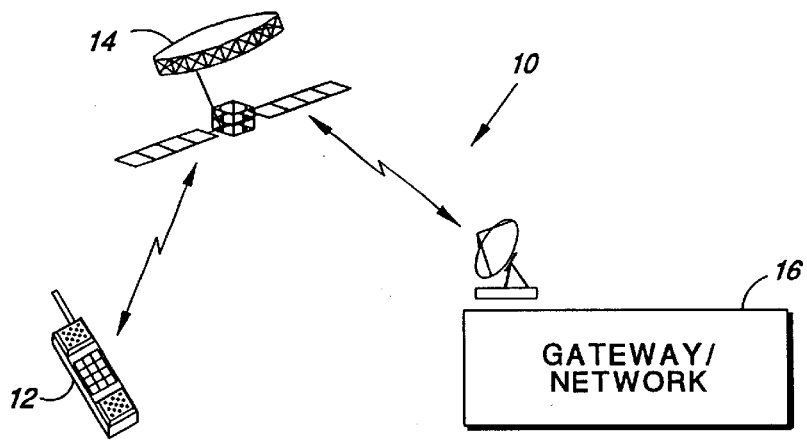
FIG. 1 is a typical satellite communicating system in which teachings of an embodiment of the present invention may be employed.

Referring first to FIG. 1, shown is a block diagram of a satellite communications system 10, including a wireless transceiver 12, a satellite relay station 14 (or satellite link) and a gateway/network 16. When the gateway/network 16 sends information to the wireless transceiver 12 via the satellite link 14, as mentioned above, a delay of about 540 milliseconds is introduced in propagating information from the gateway/network 16 to the satellite link 14 and from the satellite link 14 to the wireless transceiver 12. As a result, prior art "go-back-N" reject protocol approaches operate in a less than optimal manner in that by the time a defective frame is received at the wireless transceiver 12 and the wireless transceiver 12 determines that the defective frame includes one or more errors, several other frames have already been transmitted by the gateway/network 16. As a result, even though these frames may be error free, once a "go-back-N" reject protocol message has been sent from the wireless transceiver 12 to the gateway/network 16, incurring further delay, and resulting in the transmission of further frames by the gateway/network 16 in the meantime, the gateway/network 16 must go back to the defective frame, and retransmit it, and all frames that follow it. As a result, a great deal of unnecessary retransmission is required.

Another approach to reject protocol implementation in a satellite system is selective reject. As mentioned above, however, selective reject allows the wireless transceiver to signal the gateway/network 16 to resend any frame. Thus, if frames 4, 7 and 10 in a group of frames are determined by the wireless transceiver 12 to be defective, the wireless transceiver 12 can signal the gateway/network 16 to resend frames 4, 7 and 10 using three separate selective reject protocol messages. Similarly, if frames 1, 2 and 3 of the group of frames are defective, three separate selective reject protocol messages are sent by the wireless transceiver 12 to the gateway/network 16 in accordance with the selective reject approach.

In the "go-back-N" procedure, on detection of a defective frame, the wireless transceiver 12 sends acknowledgement to all frames that are received in sequence, and requests retransmission of the defective frame and all subsequent frames. Subsequent frames are not acknowledged until they have been successfully resent, even if there were no errors in their original transmission. As mentioned above, this wastes time, bandwidth, and delays receipt of the entire group of frames.

Selective reject is used by the data link layer entity to request retransmission of single frames. The selective reject approach may or may not incorporate the acknowledgement in accordance with whether a particular bit is sent within a control channel. Each selective reject condition is cleared upon successful receipt of the particular frame for which retransmission is requested. A data link layer entity may transmit one or more selective reject frames, each containing a different frame identifier. Frames that may have been following (or between) the frames indicated by the selective reject (with selective rejects) will not be retransmitted as a result of the gateway/network 16 having received the selective reject. Thus, by reducing the number of needlessly retransmitted frames, selective reject improves the efficiency of the datalink, while recovering missing frames. To fully realize this advantage, however, the wireless transceiver 12 having missed a frame, i.e., received a defective frame, should buffer subsequent frames until the missing frame is received. This generally imposes additional buffering and house keeping requirements on the receiving side. One limitation of the selective reject error recovery procedure is that it requires the wireless transceiver 12 to send a selective reject frame for each lost or defective frame.

In some cases, selective reject is more advantageous, and in others "go-back-N" is a more appropriate approach. In implementation, it becomes difficult for the data link layer to make a decision as to which one of theses two approaches should be used in a given case.

Due to the limitations of selective reject and built inefficiency of "go-back-N", the desired solution for a recovery in satellite networks is to use a novel approach, as described below, referred to herein as group reject. Group reject provides, in a single frame, a request for retransmission of a range of lost frames with acknowledgement. In this scheme wireless transceiver 12 need not decide whether to use "go-back-N" or selective reject.

In the examples discussed below, the wireless transceiver 12 can send a single reject message with an indication of retransmission of a range of lost frames or with acknowledgement of a single lost frame, frame without acknowledgement. The gateway/network 16, upon receipt of a group reject frame, updates its window and retransmits all requested frames. (Note that the group reject approach described herein works equally well when the wireless transceiver 12 is the sender and the gateway/network 16 is the receiver, as when the wireless transceiver 12 is the receiver and the gateway/network 16 is the sender, the latter at which is described herein.

Figure 2:
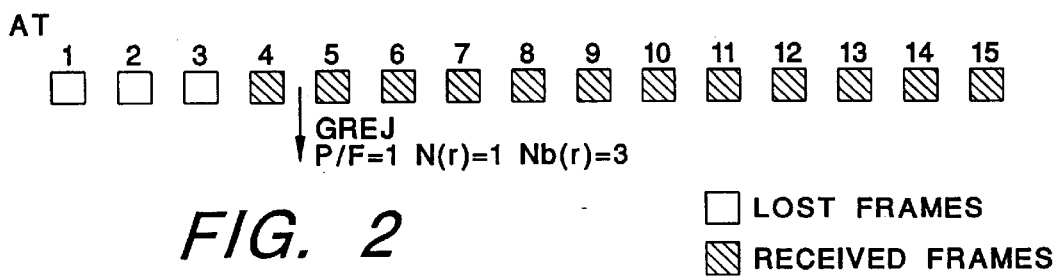
FIG. 2 is a frame diagram showing a first exemplary window of fifteen frames, with frames one through three indicated as lost or detection frames.

Referring next to FIG. 2, shown is a schematic representation of a group of frames, with defective or lost frames being indicated as open squares and successfully received frames being indicated as cross-hatched squares. If the wireless transceiver 12 detects an error in consecutive frames near the beginning of a group of frames, as shown, in accordance with selective reject protocol, the wireless transceiver 12 would generate a selective reject message for each of the lost frames. If the datalink layer utilizes the group reject approach in accordance with the embodiment described herein, it sends a single group reject frame for retransmission of the range of frames one through three, shown.

Figure 3:
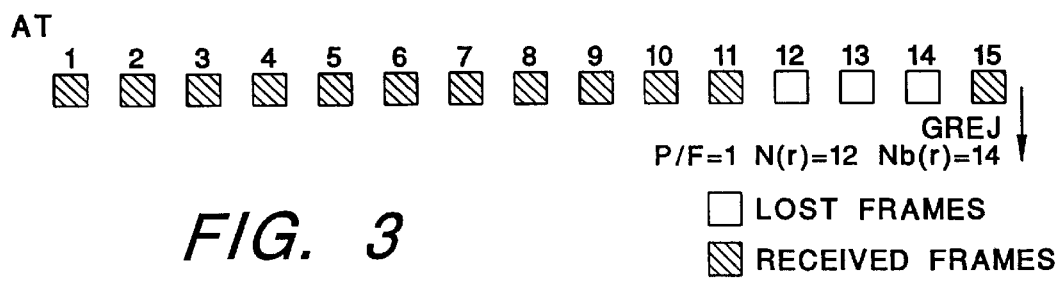
FIG. 3 is another frame diagram; and is showing a second exemplary window of fifteen frames, with frames twelve through 15 indicated as lost or defective frames.

Referring next to FIG. 3, another example is shown in a schematic diagram wherein a group of frames successfully received are indicated with cross-hatched squares and a group of defective or lost frames are indicated as open squares. A darkened square indicates a frame not ever received. Thus, shown, if the wireless transceiver detects an error at the end of its receive buffer, the wireless transceiver issues a group reject for recovery of the lost frames, in this case, frames twelve, thirteen, fourteen and an acknowledgement up to frame 11.

Figure 4:
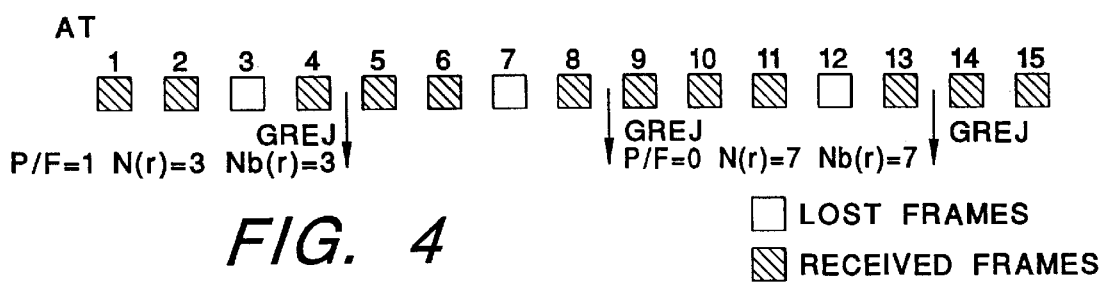
FIG. 4 is a further frame diagram showing a thorough exemplary window of fifteen frames with frames three, seven, and twelve as indicated as lost or defective frames

Referring next to FIG. 4, a diagram is shown in which cross-hatch squares indicating received frames, and open squares indicating erroneous or lost frames. Darkened frames indicate frames yet to be received. If the wireless transceiver detects an exception error or between a start and an end of receive buffers, and if this reception error involves more than one frame, the wireless transceiver can request a retransmission of the frames, in the example shown, frames three, seven and twelve. The wireless transceiver would acknowledge up to frame 2 in the instances shown.

Figure 5:
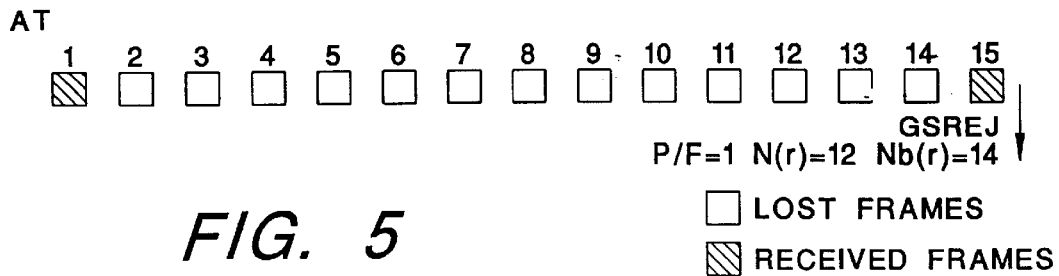
FIG. 5 is an additional frame diagram showing a forth exemplary window of fifteen frames, with frames two through fourteen indicated as lost or defective frames.

Referring next to FIG. 5, a diagram is shown in which cross-hatched squares are received frames, open squares represent erroneous or lost frames, and darkened squares indicate frames that are yet to be received. If the wireless transceiver detects an exception between the start and end of its receive buffers, in the case with the group reject only one frame is required to recover each group of lost frames. In the examples shown, frames two through fourteen could be requested with a single group reject message.

In the example shown above, a window size of 15 frames is selected in the data link layer. This means that the gateway/network 16 can send fifteen messages without waiting for acknowledgement. In addition, only one layer three message can be transmitted by the data link layer. The use information in the TCH 3 is seven bytes so a layer three message of size 120 (15×8) can be transmitted without waiting for acknowledgement. With a given round-trip delay of 540 milliseconds (270×2) and 150 milliseconds processing time in the wireless transceiver, the sender should expect response from the receiver at the end of 690 milliseconds (540=150) or about 700 milliseconds. This means the sender should be able to receive a response from the receiver at the end of the fourth message of a subsequent window. Since a window has a size of 15 frames, this is sufficient to assure that acknowledgement is received before the end of the subsequent frame.

In the case of SMS services, the maximum size of a SMS message is 256 bytes. This message requires 37 (256/7) frames to transmit. With a window size of 15 frames (messages), the sender will stop transmitting at the end of 15 frames (if the receiver does not send any response). The receiver shall respond within the first four messages of the subsequent window. In the event the gateway/network 16 does not receive a response from the receiver by the end of the 15th message of the subsequent window, the gateway/network concludes that something is in error at the receiver, and responds accordingly by, for example, retransmitting all of the frames of the window.

While the invention herein disclosed has been described by means of specific embodiments and applications thereof, numerous modifications and variations could be made thereto by those skilled in the art without departing from the scope of the invention set forth in the claims.

What is claimed is:

1. A method of error flow control in a communications system comprising:
   receiving a plurality of frames of data;
   determining in said plurality of frames of data, two or more contiguous defective frames of data, the two or more contiguous defective frames of data being followed by at least one frame of data in said plurality of frames that is not defective;
   forming a group reject message indicative of a range of the two or more contiguous defective frames;
   transmitting the group reject message; and
   receiving replacement frames, the replacement frames corresponding to the two or more contiguous defective frames, wherein said at least one frame that is not defective is not received again in response to the group reject message.

2. The method of claim 1 wherein:
   said determining two or more contiguous defective frames of data comprises determining in said plurality of frames of data, three or more contiguous defective frames of data; and
   said forming of said group reject message comprises forming a group reject message indicative of a range of the three or more contiguous defective frames.

3. The method of claim 1 further comprising:
   receiving another plurality of frames of data;
   determining in said other plurality of frames of data, one or more contiguous defective frames of data;
   forming another group reject message indicative of a range of the one or more contiguous defective frames;
   transmitting the other group reject message; and
   receiving other replacement frames, the other replacement frames corresponding to the one or more contiguous defective frames.

4. The method of claim 1 further comprising:
   receiving the group reject message;
   forming replacement frames in the range of the two or more contiguous defective frames; and
   transmitting the replacement frames.

5. The method of claim 1, further comprising the step of retransmitting said replacement frames.

6. The method of claim 1, wherein said group reject message is included in a single frame of data.

7. A method of error flow control in a communications system comprising:
   transmitting a plurality of frames of data;
   receiving a group reject message indicative of two or more contiguous ones of the plurality of frames indicated as defective frames by a receiver; and
   retransmitting each of the two or more contiguous ones of the plurality of frames.

8. The method of claim 7 wherein:
   said receiving said group reject message includes receiving a group reject message indicative of three or more contiguous ones fo the plurality of frames.

9. The method of claim 7 further comprising:
   transmitting another plurality of frames of data;
   receiving another group reject message indicative of one or more contiguous ones of the other plurality of frames indicated as defective by the receiver; and
   retransmitting each of the one or more contiguous ones of the other plurality of frames.

10. The method of claim 7 further comprising:
    receiving said plurality of frames of data;
    determining in said plurality of frames of data, the two or more contiguous defective frames of data;
    forming said group reject message indicative of a range of said two or more contiguous defective frames;
    transmitting said group reject message; and
    receiving replacement frames, said replacement frames corresponding to said two or more contiguous defective frames.

11. The method of claim 7, wherein said retransmitting step retransmits each of the two or more contiguous ones of the plurality of frames without retransmitting any frame not defectively received by said receiver.

12. The method of claim 7, wherein said group reject message is included in a single frame of data.

13. A method of error flow control in a communications system comprising:
    defining a plurality of time periods during which frames of data are expected;

determining in said plurality of time periods of data, two or more defective frames of data, the two or more defective frames of data being of a type selected from the group of types consisting of error-containing and missing, the two or more contiguous defective frames of data being followed by at least one frame of data in said plurality of time periods that is not defective;

forming a group reject message indicative of a range of the two or more contiguous defective frames;

transmitting the group reject message; and receiving replacement frames, the replacement frames corresponding to the two or more contiguous defective frames, wherein said at least one frame that is not defective is not received again in response to the group reject message.

14. The method of claim 13 further comprising:

defining another plurality of time periods during which frames of data are expected;

determining in said other plurality of time periods of data, one or more contiguous defective frames of data, the one or more contiguous defective frames being of a type selected from the group of types;

forming another group reject message indicative of a range of the one or more contiguous defective frames;

transmitting the other group reject message; and receiving other replacement frames, the other replacement frames corresponding to the one or more contiguous defective frames.

15. The method of claim 13, further comprising the step of retransmitting said replacement frames.

16. The method of claim 13, wherein said group reject message is included in a single frame of data.

* * * * *